US011043895B2

(12) United States Patent
Lin et al.

(10) Patent No.: US 11,043,895 B2
(45) Date of Patent: Jun. 22, 2021

(54) BUCK CONVERTER INCLUDING FREQUENCY-DEPENDENT BACK-FLOW CIRCUIT

(71) Applicant: LEDVANCE GmbH, Garching bei Munchen (DE)

(72) Inventors: Shengdie Lin, Guangdong (CN); Yongchang Dai, Guangdong (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 16/415,445

(22) Filed: May 17, 2019

(65) Prior Publication Data
US 2019/0356224 A1 Nov. 21, 2019

(30) Foreign Application Priority Data
May 17, 2018 (CN) .......................... 201810475547.5

(51) Int. Cl.
*H02M 3/156* (2006.01)
(52) U.S. Cl.
CPC .................................. *H02M 3/156* (2013.01)
(58) Field of Classification Search
None
See application file for complete search history.

(56) References Cited

U.S. PATENT DOCUMENTS

| | | | | |
|---|---|---|---|---|
| 2011/0169469 A1* | 7/2011 | Li | ........................... | H02M 1/32 323/282 |
| 2012/0242307 A1* | 9/2012 | Higuchi | ................ | H02M 3/156 323/273 |
| 2014/0049235 A1* | 2/2014 | Li | ............................. | G05F 1/46 323/271 |
| 2014/0265907 A1* | 9/2014 | Su | ...................... | H05B 33/0815 315/224 |
| 2015/0366014 A1* | 12/2015 | Itoh | ..................... | H05B 33/0815 315/200 R |
| 2016/0204715 A1* | 7/2016 | Fujimoto | .............. | H02M 3/156 363/89 |
| 2016/0329846 A1* | 11/2016 | Shimomugi | .......... | H02M 3/158 |

* cited by examiner

*Primary Examiner* — Jeffrey A Gblende
(74) *Attorney, Agent, or Firm* — Hayes Soloway PC

(57) ABSTRACT

A buck converter for converting a DC input voltage into a DC output voltage comprises a DC input circuit with a positive input terminal and a negative input terminal, for providing a DC input voltage, a converter circuit for converting a DC input voltage into a DC output voltage, and a DC output circuit with a positive output terminal, a negative output terminal and an output capacitor connected between the positive output terminal and the negative output terminal. The buck converter further comprises a switching device with a first switching terminal connected with the positive input terminal and a second switching terminal connected over a charging diode with the negative input terminal, a charging inductor as well as a frequency-dependent back-flow circuit connecting the positive output terminal with a power supply terminal of the switching device for supporting the power supply of the switching device.

20 Claims, 1 Drawing Sheet

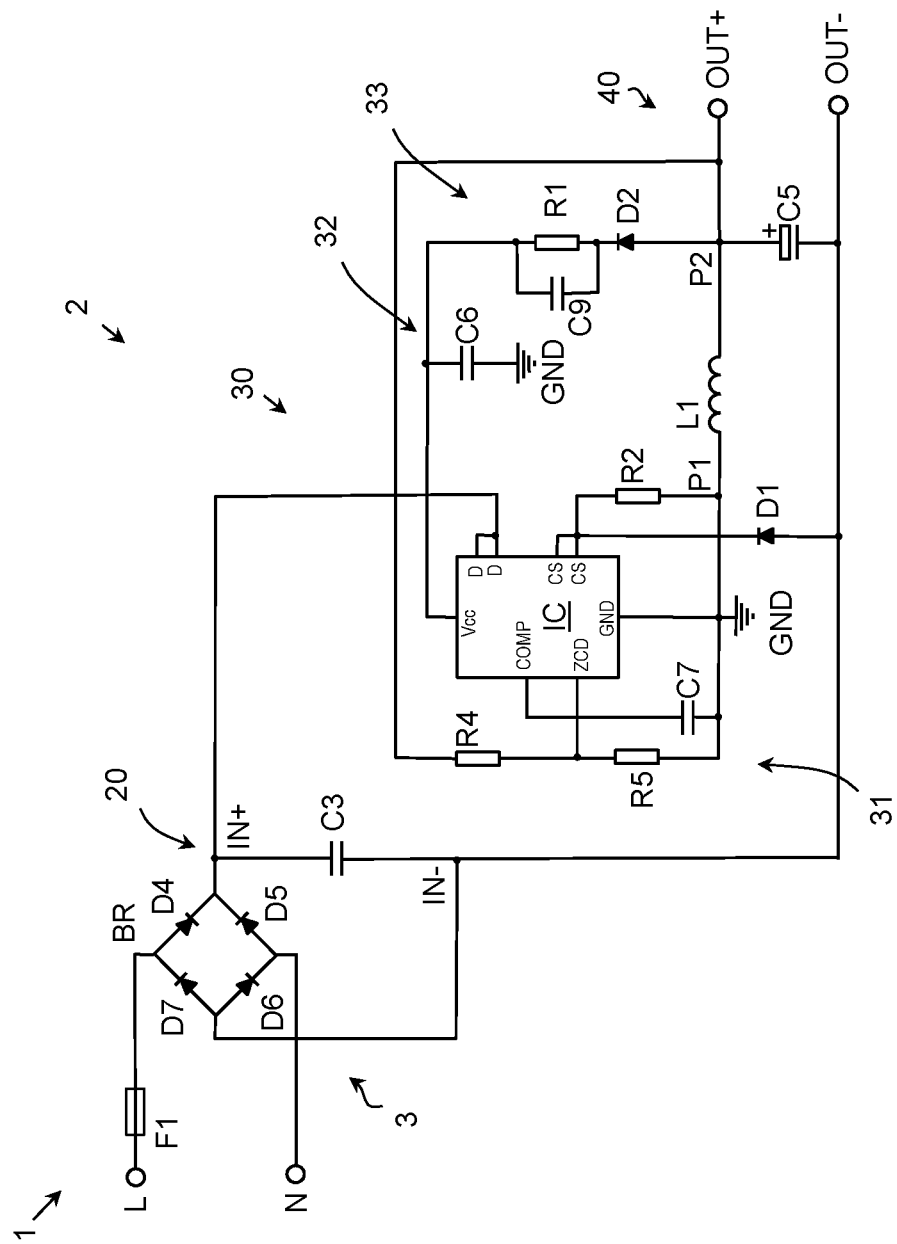

BUCK CONVERTER INCLUDING FREQUENCY-DEPENDENT BACK-FLOW CIRCUIT

CROSS-REFERENCE TO RELATED APPLICATIONS AND PRIORITY

This patent application claims priority from CN Patent Application No. 201810475547.5 filed May 17, 2018, which is herein incorporated by reference in its entirety.

The technical field of the present application generally relates to buck converters, in particular to high output voltage buck converters.

More and more LED (light emitting diode) products, such as LED lamps, LED tubes etc., require high luminous efficiency. Therefore, it is desirable that the driver circuits for LED products should have high efficiency as well. One way of increasing the efficiency of the LED products is to increase the output voltage of the LED drivers. For buck converters which are not configured for high output voltages, increasing the output voltage can lead to irregularities, deteriorating the performance of the buck converters.

The object of the present application is to provide a high output voltage buck converter as well as a method for operating the high output voltage buck converter.

According to a first aspect, a buck converter for converting a DC input voltage into a DC output voltage is provided, in particular, for powering a DC consumer with a desired or predefined DC voltage. The buck converter comprises a DC input circuit with a positive input terminal and a negative input terminal, for providing the DC input voltage. The buck converter further comprises a converter circuit for converting the DC input voltage into the DC output voltage and a DC output circuit with a positive output terminal, a negative output terminal and an output capacitor connected between the positive output terminal and the negative output terminal, in particular, for providing a DC output voltage to a DC consumer or a load connected to the positive output terminal and the negative output terminal, respectively.

The buck converter also comprises a switching device with a first switching terminal connected with the positive input terminal and a second switching terminal connected over a charging diode with the negative input terminal. Further, the buck converter comprises a charging inductor with a first terminal connected over a charging resistor with the second switching terminal of the switching device and a second terminal connected with the positive output terminal. The switching device is configured to periodically power the charging inductor for providing a charging current for the output capacitor.

The buck converter further comprises a frequency-dependent back-flow circuit connecting the positive output terminal with a power supply terminal of the switching device for supporting the power supply of the switching device.

In case of a high output voltage, in particular when the DC output voltage is approaching the DC input voltage, the back-flow circuit can support and stabilize the power supply of the switching device such that the buck converter can operate in a proper way even at DC output voltages so close to the DC input voltage that the power supply of the switching device would otherwise collapse or at least irregularities associated with deficiencies in the power supply of the switching device would occur. In the present context, high output voltage of the buck converter means, in particular, that the DC output voltage is as high as 90% of the DC input voltage or even higher, i.e. closer to the DC input voltage. Hence, the buck converter enables an increase of the output voltage and bringing the output voltage closer to the input voltage without causing instabilities in the operation of the converter.

Hence, the operational range of the output DC voltages of the buck converter can be increased without incurring instabilities or flickering, thus enabling the usage of the buck converter for DC power consumers with DC voltages close to the input voltage of a DC converter. The DC power consumers may be in particular LED arrays in LED products, such as LED lamps, LED light bulbs, LED ceiling light, LED tubes or similar.

The buck converter may be, in particular, configured as a self-powered buck converter. In particular, the buck converter may be provided in a self-powering topology. Thus, the buck converter can be powered by the input DC voltage which is to be converted. By using the self-powering topology, additional power supplies can be avoided, resulting in a simple and cost-effective buck converter. By supporting the power supply of the switching device, the back-flow circuit can ensure a proper operation of the self-powered buck converter at elevated output voltages, even without additional external power source.

Thus, the deterioration of the operation of the buck converter for the DC output voltages close to the DC input voltage, resulting in buck choke or collapse of the DC output voltage, instabilities or flickering of LED lights powered by the buck converter can be effectively avoided or subdued.

The frequency dependent back-flow circuit may be configured such that the impedance of the frequency-dependent back-flow circuit is lower for a faster changing current and higher for a slower changing current. In particular, the frequency dependent back-flow circuit may be configured a high-pass filter such that the impedance of the frequency-dependent back-flow circuit decreases with an increasing changing rate of the changing current and increases with decreasing changing rate of the charging current. Thus, rapidly changing charging current flowing through the charging inductor contributes more to the back-flow current for supporting the power supply of the switching device than relatively slowly changing portions of the charging current. In this way, the stabilization of the power supply of the switching device can be combined with a high conversion efficiency of the buck converter. Due to the high conversion efficiency, the efficiency of LED drivers based on such buck converters can be increased as well, leading to the overall efficiency growth of the LED products.

The back-flow circuit may be a capacitive back-flow circuit. In particular, the back-flow circuit may comprise one or more capacitors provided in the back-flow circuit. With a capacitive back-flow circuit, a desired frequency-dependency of the back-flow circuit can be easily achieved.

The switching device may comprise at least one internal switch configured to periodically or cyclically connect and disconnect the first terminal and the second terminal of the switching device with an adjustable duty cycle. By closing and opening the switch in the switching device, the charging inductor can be powered in order to charge the output capacitor to a desired output voltage. In particular, by connecting and disconnecting the first terminal and the second terminal of the switching device with an adjustable duty cycle or ratio of on-period within one cycle to the entire period of a cycle, the output DC voltage can be easily adjusted.

The power supply terminal of the switching device may be equipped with an external power terminal capacitor connecting the power terminal with a ground line. The power terminal capacitor can serve for protecting the switching device from transients and for further stabilization of the power supply of the switching device.

The frequency-dependent back-flow circuit may comprise a back-flow resistor with a first end connected to the power supply terminal and with a second end connected with a cathode of a back-flow diode which is connected with the anode side to the positive output terminal, wherein the back-flow circuit further comprises a back-flow capacitor connected in parallel to the back-flow resistor. Due to the integrating property of the back-flow capacitor which is connected in parallel with the back-flow resistor, the impedance of the back-flow circuit is particularly low for higher frequencies or for rapidly changing current component, such the faster changing charging current, in particular for every rising edge of the switch cycle, provides relatively regarded bigger contribution to the back-flow current than slower changing charging current. When the switching state of the internal switch changes form the on-state to the off-state, in the case of forward-biased back-flow diode, the impedance of the back-flow circuit can be particularly low, providing for an efficient compensation of the power supply drop. In particular, due to the capacitive integral characteristic, rising edges of switch cycle can provide for high current for charging the power terminal capacitor, even at higher values of the resistivity of the back-flow resistor.

The back-flow resistor serves for restriction of the back-flow current, in particular in the case of relatively slowly changing charging current, while the back-flow diode prevents current flow from the power supply terminal of the switching device.

The capacitance of the back-flow capacitor may be smaller than 200 pF, in particular smaller than 150 pF, and the resistivity of the back-flow resistor may be larger than 50 kOhm, in particular, larger than 70 kOhm, respectively.

These ranges of the capacitance and the resistivity of the back-flow capacitor and the back-flow resistor can provide for an efficient compensation of the power supply drop of the switching device and a high level of conversion efficiency at the same time, in particular for the values of the DC output voltage close to the DC input voltage.

The buck converter may comprise a feedback circuit connected between the positive output terminal with the first terminal of the charging inductance, for providing a feedback signal at the feedback terminal of the switching device. In particular, the feedback circuit may comprise a voltage divider with a first feedback resistor and a second feedback resistor connected in series, the connection point of the first feedback resistor and the second feedback resistor connected with the feedback terminal of the switching device.

The feedback circuit provides a feedback voltage, indicative of the output voltage, at the feedback terminal of the switching device, for self-regulating of the DC converter, ensuring that the output voltage corresponds to a predefined value of the output voltage.

According to another aspect a DC power supply is provided. The DC power supply comprises a buck converter according to the first aspect and an AC-DC converter for providing a DC input voltage for the buck converter. The AC-DC converter may be, in particular, provided separately or configured as part of the input circuit of the buck converter. The AC-DC converter may, in particular, comprise a bridge rectifier and a smoothing capacitor for providing a DC input voltage for the buck converter.

The AC-DC converter is characterized by a high conversion efficiency and high reliability even at elevated DC output voltages. In particular, due to the back-flow circuit configuration of the buck converter, a drop in the power supply, especially when the output voltage value approaches the DC input voltage of the buck converter i.e. the DC output voltage of the AC-DC converter, can be compensated by the back-flow current while maintaining high conversion efficiency, by virtue of increased resistivity of the back-flow resistor, in particular enabled by providing the back-flow capacitor.

According to a further aspect a method of operation of a buck convertor converting a DC input voltage into a DC output voltage is provided. The method comprises periodically powering a charging inductor for providing a charging current for an output capacitor by a switching device of the buck converter. The method further comprises branching off a portion of the charging current flowing through the charging inductor over a frequency-dependent back-flow circuit for supporting a power supply of the switching device.

Due to the branching off a portion of the charging current flowing through the charging inductor over a frequency-dependent back-flow circuit for supporting a power supply of the switching device, the proper operation of the buck converter can be ensured, and a high conversion efficiency can be achieved, in particular at elevated output voltages.

In an embodiment of the method the ratio of the DC output voltage to the DC input voltage Vo/Vi, at least temporarily, lies in the range $0.90<Vo/Vi<0.99$, in particular, $0.95<Vo/Vi<0.98$.

By increasing the values the DC output voltage close to the value of the DC input voltage, the demand of DC consumers for accordingly high DC voltage supply can be met.

In the following description, details are provided to describe the embodiments of the present specification. It shall be apparent to one skilled in the art, however, that the embodiments may be practiced without such details.

Some parts of the embodiments have similar parts. The similar parts may have same names or similar part numbers. The description of one part applies by reference to another similar part, where appropriate, thereby reducing repetition of text without limiting the disclosure.

FIG. 1 shows a circuit diagram of a DC power supply according to an embodiment.

The DC power supply 1 shown in FIG. 1 is based on a high output voltage self-powered buck converter, according to the first aspect of the present specification, for converting an input direct current (DC) voltage into an output DC voltage for powering DC consumers, such as e.g. LED lamps or LED-arrays, but not limited thereto.

The DC power supply 1 comprises a buck converter 2 and an AC-DC converter 3 for providing a DC input voltage to the buck converter 2.

The buck converter 2 comprises an input circuit 20, a converter circuit 30 and an output circuit 40.

The DC input circuit 20 comprises a positive input terminal IN+ and a negative input terminal IN− for providing a DC input voltage to the converter circuit 30. The DC output circuit 40 comprises a positive output terminal OUT+, a negative output terminal OUT− and an output capacitor C5 connected between the positive output terminal OUT+ and the negative output terminal OUT−. In this embodiment, the output capacitor is an electrolyte capacitor with its positive terminal connected with the positive output terminal OUT+ and its negative terminal connected with the negative output terminal OUT−.

The converter circuit 30 comprises a switching device IC. In this embodiment, the switching device IC is an integrated semiconductor switching device.

The switching device IC comprises an internal electrical switch and an internal circuitry configured for usage of the switching device in DC-DC converters. The electrical switch and the circuitry are not shown in FIG. 1. The switching device IC further comprises a pair of drain terminals D, a pair of source terminals CS, a power terminal Vcc, a feedback terminal ZCD, a compensation terminal COMP and a ground terminal GND. In this embodiment, the switching device is a commercially available integrated switching device KP1061 of Kiwi Instruments Corporation. Similar integrated switching devices configured for usage in buck converters can be used as well.

In an embodiment, the electrical switch of the switching device IC is an internal semiconductor switch comprising a "normally off" MOSFET with a gate, a source and a drain, wherein the drain of the MOSFET is connected with the pair of drain terminals D and the source of the MOSFET is connected with the pair of source terminals CS. The pair of drain terminals D is connected with the positive input terminal IN+ and the pair of source terminals CS is connected over a charging diode D1 with the negative input terminal IN−. The gate of the MOSFET is controllable by the internal circuitry of the circuit device in such a way that the MOSFET can be switched on and off, periodically or in a cycled manner.

The converter circuit 30 further comprises a charging inductor L1 with a first terminal P1 and a second terminal P2. The first terminal P1 of the charging inductance L is connected over a charging resistor R2 to the source terminal CS of the switching device IC. A second terminal P2 of the charging inductance L is connected with the positive output terminal OUT+.

The converter circuit 30 further comprises a feedback circuit 31 connecting the positive output terminal OUT+ with the first terminal P1 of the charging inductance L. The feedback circuit comprises a first feedback resistor R4 and a second feedback resistor R5 connected in series. The connection point of the first feedback resistor R4 and the second feedback resistor R5 is connected with the feedback terminal ZCD of the switching device IC.

The converter circuit 30 also comprises a power terminal circuit 32 with a power terminal capacitor C6 connecting power terminal Vcc of the switching device IC with a ground line. As well as a compensation capacitor C7 connected between the compensation terminal COMP and the ground terminal GND and serves for the power factor compensation of the buck convertor 2.

The converter circuit 30 further comprises a back-flow circuit 33 with a back-flow capacitor C9. The back-flow circuit 33 is connecting the positive output terminal OUT+ with the power terminal Vcc of the switching device IC. The back-flow circuit 33 further comprises a back-flow resistor R1 connected in parallel to the back-flow capacitor C9 and a backflow diode D2 connected in series to the back-flow capacitor C9 and the back-flow resistor R1, such that the anode side of the back-flow diode D2 is connected with the positive output terminal OUT+.

The input circuit 20 comprises an AC input with a first AC input terminal L and a second AC input terminal N. The input circuit 20 further comprises a bridge rectifier BR comprising four diodes D4, D5, D6 and D7 and a smoothing capacitor C3 and a fuse F1. The cathode sides of the diodes D4 and D5 are connected with the positive input terminal IN+. the anode sides of the diodes D6 and D7 are connected with the negative input terminal IN−. The first AC input terminal L is connected with a first end of the fuse F1. The cathode side of the diode D7 is connected with the anode side of the diode D4 and with a second end of the fuse F1. The cathode side of the diode D6 is connected with the anode side of the diode D5 and with the second AC input terminal N.

In operation, an AC power is applied on the first AC input terminal L and the second AC input terminal N. The AC input power is rectified by the bridge rectifier BR charging the smoothing capacitor C3 for providing an essentially DC input voltage at the positive input terminal IN+ and the negative input terminal IN−, respectively. In the self-powering topology of the converter circuit 30 of the embodiment, the DC input voltage also serves for powering the switching device IC.

The switching device IC periodically opens and closes the internal switch such that the pair of drain terminals D is periodically connected with the pair of source terminal CS for periodically powering the charging inductance L, thus generating a charging current flowing through the inductance L, thus charging the output capacitor C5 for outputting a DC output voltage.

In particular, in the on-state of the internal switch, current flows from the positive input terminal IN+ over the drain terminals D and the source terminals CS through the charging resistor R2 and the inductor L1 to the positive output terminal OUT+ for charging the output capacitor C5. In the case of increasing current, the inductor L1 can operate as a resistance reducing the DC output voltage (Vo) as compared with the DC input voltage (Vi), while in the off-state of the internal switch, the inductor L1 operates as a current generator for charging the output capacitor C5, the diode D1 is forward-biased and the current can flow through the diode D1 and the inductor L1 for charging the output capacitor C5 and thus for providing the DC output voltage Vo with is dependent on the duty cycle of the internal switch.

The feedback circuit 31 provides a feedback voltage at the connection point of the first feedback resistor R4 and the second feedback resistor R5 with the feedback terminal ZCD for ensuring that the DC output voltage Vo corresponds to a predefined value of the DC output voltage.

A portion of the charging current flowing though the inductor L1 can flow through the back-flow circuit 33 to the power terminal circuit 32. The back-flow current can compensate the voltage drop at the power supply terminal Vcc, in particular, in the case when the output voltage Vo is so close to the input voltage Vi that without the back-flow current the self-powering of the switching device IC would collapse or at least a proper operation of the switching device IC would be deteriorated.

Furthermore, due to the integral characteristic of the back-flow capacitor C9 which is connected in parallel with the back-flow resistor R1, the impedance of the back-flow circuit is in particular low for higher frequencies or for rapidly changing current component, such that the relatively rapid changes of the current, in particular, when the switching state of the internal switch changes, in particular from the on-state to the off-state, the impedance of the back-flow circuit, in the case of forward-biases back-flow diode D2, is particularly low, providing for an efficient compensation of the power supply drop by the transient currents flowing through the conductor L. In particular, due to the integrating characteristic of the capacitive back-flow circuit, every rising edge of switch cycle will provide a current charge for the power terminal capacitor C6, even at higher values of the resistivity of the back-flow resistor R1. In particular, the resistivity of the back-flow resistor R1 can be as high as 75 kOhm or even higher.

For the slower current component, for instance in the off-state of the internal switch and in the case of forward-biases back-flow diode, the impedance of the back-flow circuit 33 is mainly defined by the back-flow resistor R1. Thus, by increasing the resistivity of the back-flow resistor R1, the current losses can be reduced.

Thus, the back-flow circuit 33 shows a behavior of a high-pass filter, providing for efficient compensation of the power supply drop at the power supply terminal. In particular, the capacitive back-flow circuit 33 ensures a stable operation of the self-powered switching device, even if the output voltage is so close to the input voltage, that the self-power-supply of the switching device would otherwise collapse, while maintaining a higher converter efficiency, due to higher resistivity of the back-flow resistor R1.

The power loss P_R1 on the back-flow resistor R1 can be calculated with the following approximate formula:

$$P\_R1=(Vo-Vdd-V\_D2)^2/R1*(Vo/Vin*1.1414)/Pin*100\%$$

In this formula, Vo designates the output voltage, Vdd designates the voltage at the power supply terminal Vcc, Vin is the AC input voltage applied at the AC input terminals L and N.

In an embodiment, R1=75 kOhm and C9=100 pF. In the case when Vo=105 V, Vdd=13.5 V, V_D2=1 V and Vin=230 V, the power loss calculated by the above formula is approximately 0.67%.

On the other hand, in the case when no back-flow capacitor is provided, or when the capacitance of the back-flow capacitor C9 equals 0 pF, the resistivity of the back-flow resistor R1 should be reduced in order to provide the same level of compensation of the the power supply drop, in particular when the output voltage Vo is close to the input voltage Vi. In an exemplary case of R1=22 kOhm, the above formula would read to the power loss P_R1 of approximately 2.2% which is more than threefold of the power loss in the case of the capacitive back-flow circuit, as calculated above.

Thus, based on a conventional or classical buck converter topology, the flickering of the buck converter at elevated output voltages can be effectively subdued, while providing a high efficiency of the buck converter.

In this way, the operational range of the output DC voltage can be increased without experiencing converter collapse or operational instabilities, which would adversely affect the operation of the DC power output. In particular, in the case of driving light sources, such as LED arrays, the operational instabilities might be visually perceptible as irritating flickering of the light sources.

Moreover, the reduction of the power loss in the case of the capacitive back-flow circuit maintains also in the cases when the output voltage Vo is not very close to the input voltage Vi.

In above mentioned exemplary case when R1=75, C9=100 pF, for the output voltage Vo=105 V, the power loss in the case of AC input voltage of 230 V is approximately 0.67%. This value is much smaller than the power loss of 2.22 in the case of non-capacitive back-flow circuit, in particular when R1=22 kOhm and the C9=0 F.

While at least one exemplary embodiment has been presented in the foregoing detailed description, it should be appreciated that a vast number of variations exists. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

REFERENCE SYMBOLS AND NUMERALS

1 DC power supply
2 buck converter
3 AC-DC converter
20 input circuit
30 converter circuit
31 feedback circuit
32 power terminal circuit
33 back-flow circuit
40 output circuit
BR bridge rectifier
IN+ positive input terminal
IN− negative input terminal
L first AC input terminal
N second AC input terminal
OUT+ positive output terminal
OUT− negative output terminal
C3 smoothing capacitor
C5 output capacitor
C6 power terminal capacitor
C7 compensation capacitor
C9 back-flow capacitor
D1 charging diode
D2 back-flow diode
D4, D5, D6, D7 bridge rectifier diode
F1 fuse
L1 charging inductance
IC switching device
D drain terminal
CS source terminal
Vcc power supply terminal
ZCD feedback terminal
COMP compensation terminal
GND ground terminal
P1 first terminal of the charging inductance
P2 second terminal of the charging inductance
R1 back-flow resistor
R2 charging resistor
R4 first feedback resistor
R5 second feedback resistor

The invention claimed is:

1. A buck converter for converting a DC input voltage into a DC output voltage, the buck converter comprising:
 a DC input circuit with a positive input terminal and a negative input terminal, wherein the DC input circuit is configured for providing a DC input voltage;
 a DC output circuit with a positive output terminal, a negative output terminal, and an output capacitor connected between the positive output terminal and the negative output terminal; and
 a converter circuit configured for converting the DC input voltage into the DC output voltage, the converter circuit comprising:
  a switching device with a first switching terminal connected with the positive input terminal and a second switching terminal connected over a charging diode with the negative input terminal;
  a charging inductor with a first terminal connected over a charging resistor with the second switching terminal of the switching device and a second terminal connected with the positive output terminal, wherein the switching device is configured to periodically power the charging inductor for providing a charging current for the output capacitor; and a frequency-dependent back-flow circuit connecting the positive output terminal with a power supply terminal of the switching device, wherein a portion of the charging current flowing through the charging inductor is branched off over the frequency-dependent back-flow circuit for supporting the power supply of the switching device;

wherein the frequency-dependent back-flow circuit is configured as a high-pass filter such that an impedance of the frequency-dependent back-flow circuit:

decreases with an increasing changing rate of the charging current; and increases with a decreasing changing rate of the charging current.

2. The buck converter of claim 1, wherein the buck converter is configured as a self-powering switching device.

3. The buck converter of claim 1, wherein an impedance of the frequency-dependent back-flow circuit is lower for a faster changing current and higher for a slower changing current.

4. The buck converter of claim 1, wherein the frequency-dependent back-flow circuit is a capacitive back-flow circuit.

5. The buck converter according to claim 1, wherein the switching device comprises at least one internal switch configured to periodically connect and disconnect the first switching terminal and the second switching terminal with an adjustable duty cycle.

6. The buck converter according to claim 1, wherein the power supply terminal of the switching device is equipped with an external power terminal capacitor connecting the power supply terminal with a ground line.

7. The buck converter of claim 4, wherein the frequency-dependent back-flow circuit comprises:

a back-flow resistor with a first end connected to the power supply terminal and with a second end connected with a cathode of a back-flow diode connected with its anode side to the positive output terminal; and a back-flow capacitor connected in parallel to the back-flow resistor.

8. The buck converter of claim 7, wherein a capacitance of the back-flow capacitor is smaller than 200 pF and a resistivity of the back-flow resistor is larger than 50 kOhm.

9. The buck converter of claim 1, wherein the buck converter further comprises a feedback circuit connected between the positive output terminal and the first terminal of the charging inductor, wherein the feedback circuit is configured for providing a feedback signal at a feedback terminal of the switching device.

10. A DC power supply comprising:
the buck converter of claim 1; and
an AC-DC converter configured for providing the DC input voltage for the buck converter.

11. The buck converter of claim 6, wherein the frequency-dependent back-flow circuit is configured such that a rising edge of a switch cycle provides a current charge for the external power terminal capacitor.

12. The buck converter of claim 7, wherein a capacitance of the back-flow capacitor is smaller than 150 pF and a resistivity of the back-flow resistor is larger than 70 kOhm.

13. The buck converter of claim 7, wherein:
the back-flow resistor is configured to restrict back-flow current; and
the back-flow diode prevents current flow from the power supply terminal of the switching device.

14. The buck converter of claim 1, wherein the frequency-dependent back-flow circuit is configured to provide a back-flow current that at least partially compensates for a voltage drop at the power supply terminal of the switching device in the case when a ratio of the DC output voltage to the DC input voltage at least temporarily lies in the range of 0.90-0.99.

15. The buck converter of claim 1, wherein the converter circuit is configured to reduce or prevent at least one of buck choke and collapse of the DC output voltage.

16. A buck converter for converting a DC input voltage into a DC output voltage, the buck converter comprising:

a DC input circuit with a positive input terminal and a negative input terminal, wherein the DC input circuit is configured for providing a DC input voltage;

a DC output circuit with a positive output terminal, a negative output terminal, and an output capacitor connected between the positive output terminal and the negative output terminal; and a converter circuit configured for converting the DC input voltage into the DC output voltage, the converter circuit comprising:

a switching device with a first switching terminal connected with the positive input terminal and a second switching terminal connected over a charging diode with the negative input terminal;

a charging inductor with a first terminal connected over a charging resistor with the second switching terminal of the switching device and a second terminal connected with the positive output terminal, wherein the switching device is configured to periodically power the charging inductor for providing a charging current for the output capacitor; and a frequency-dependent back-flow circuit connecting the positive output terminal with a power supply terminal of the switching device, wherein a portion of the charging current flowing through the charging inductor is branched off over the frequency-dependent back-flow circuit for supporting the power supply of the switching device;

wherein the frequency-dependent back-flow circuit comprises a back-flow resistor, a back-flow capacitor, and a back-flow diode, wherein:

the back-flow resistor is connected in parallel to the back-flow capacitor; and the back-flow diode is connected in series to the back-flow capacitor and the back-flow resistor.

17. The buck converter of claim 16, wherein an anode side of the back-flow diode is connected with the positive output terminal of the DC output circuit.

18. The buck converter of claim 16, wherein:
a first end of the back-flow diode is connected with the second terminal of the charging inductor;
a second end of the back-flow diode is connected with both a first end of the back-flow resistor and a first end of the back-flow capacitor; and
a second end of the back-flow resistor is connected with both the power supply terminal of the switching device and a second end of the back-flow capacitor.

19. The buck converter of claim 16, wherein the buck converter further comprises a feedback circuit connected between the positive output terminal and the first terminal of the charging inductor, wherein the feedback circuit is configured for providing a feedback signal at a feedback terminal of the switching device.

20. A DC power supply comprising:
the buck converter of claim 16; and an AC-DC converter configured for providing the DC input voltage for the buck converter.

* * * * *